Dec. 26, 1933.  T. G. MYERS  1,941,313
SUBMERSIBLE MOTOR
Filed Sept. 3, 1929
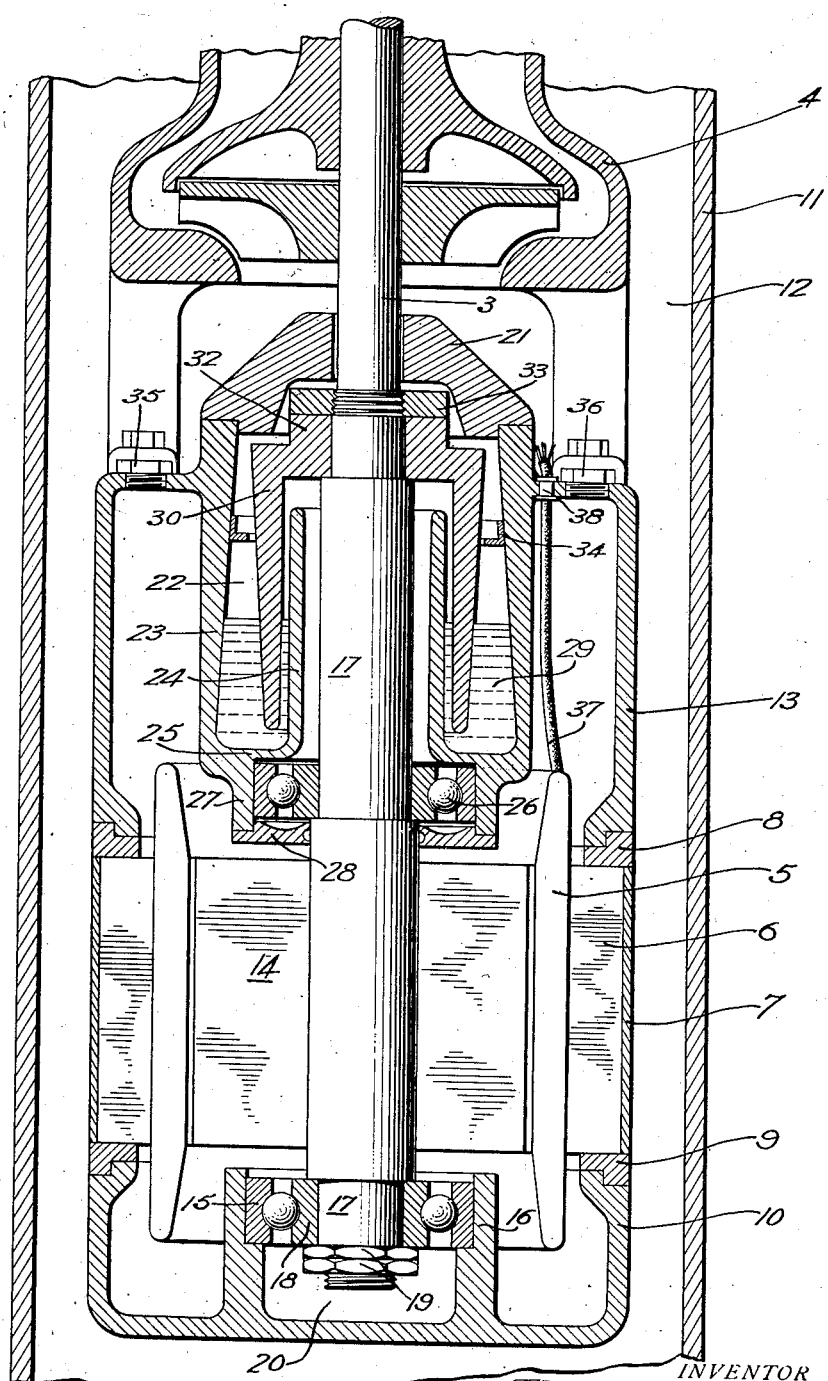
INVENTOR
Thomas G. Myers.
BY John Flam
ATTORNEY Patented Dec. 26, 1933

1,941,313

UNITED STATES PATENT OFFICE 1,941,313

SUBMERSIBLE MOTOR

Thomas G. Myers, Los Angeles, Calif., assignor to U. S. Electrical Manufacturing Company, Los Angeles, Calif., a corporation of California Application September 3, 1929. Serial No. 390,115

10 Claims. (Cl. 172—36)

This invention relates to a submersible mechanism, and especially to a motor or other source of power that is adapted to be operated while submerged in a liquid.

It is now quite common to provide a pump in an oil well for bringing the oil to the surface. Ordinarily, the pump is operated from a surface motor; but it is evident that in deep wells, such an overhead mechanism is not desirable. Since some oil wells are thousands of feet deep, the undesirability of this method of pumping becomes still greater for such wells.

It is one of the objects of my invention to make it possible to pump the oil by the aid of a motor that is submersed in the well and closely spaced to the pump. Preferably an electric motor is used for this purpose, the leads that provide the energizing current being simply extended down into the well.

In providing such a submersible motor, I do not desire to limit its application to oil wells, as it can have other similar uses.

In oil wells, the pump motor has to operate while submerged in water or in a watery sludge. The windings of the motor must be kept clear of this material in order to prevent injury thereto. This is a problem which has been found difficult of solution, and my present invention is intended in a simple manner to make it safe to operate an electric motor in a liquid without permitting the liquid to pass to the windings.

I accomplish this advantageous result by providing a fluid tight seal for the shaft of the motor.

My invention possesses many other advantages, and has other objects which may be made more easily apparent from a consideration of one embodiment of my invention. For this purpose I have shown a form in the drawing accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawing:

The single figure is a sectional view of my improved motor, shown as located in an oil well and directly connected to a pump.

The oil well casing 11 is shown as having an aqueous filling 12 in which the motor is submerged. The motor is arranged generally in a vertical direction, and as having a shaft 3 directly connected to a pump 4.

The essential parts of the motor are the windings. A stator winding 5 is diagrammatically illustrated, supported on laminations 6 held in a thin metal casing section 7. This section 7 has two flanges 8 and 9 joining it in a fluid tight manner respectively to a bottom or lower casing section 10, and an upper casing section 13. These sections 10 and 13 can be conveniently made from castings. The rotor 14 is fast on shaft 3 and is shown in a purely diagrammatic fashion. It is to be understood that it usually comprises laminations and a winding; in the case of an induction motor, this rotor winding can be in the form of a squirrel cage winding, as is well understood.

The shaft 3 extends, at least at one end, out of the casing 10—7—13; and in this instance it is shown as extending upwardly to be directly connected to the pump 4. The lower end of the shaft can be supported in a ball bearing. This bearing has a ball race 15 mounted in a central collar 16 in section 10; and on a reduced portion 17 of shaft 3 is carried a corresponding race 18. Nuts 19 can be used to hold this race firmly in place on portion 17. The lower section 10 can serve entirely to enclose this bearing structure against admission of the external matter 12; and this is accomplished conveniently by permitting the end of shaft 3 to extend into the pocket 20 formed by collar 16.

The upper casing section 13 has a removable collar 21 through which the shaft 3 extends. The casing also has an interior annular chamber 22 formed by a reentrant portion 23 of section 13 and an interior collar or sleeve 24 rather closely spaced from shaft 3 and extending a considerable distance above the bottom wall 25 of the chamber 22. If desired, another bearing can be provided for shaft 3 adjacent the lower portion of sleeve 24, as indicated by the ball bearing structure 26. This structure is placed in a recess formed at the lower side of the reentrant portion 23, by the flange 27. A cover 28 surrounds shaft 3 and is fastened over the edge of flange 27.

In order to protect the inside of the motor from the material 12 in the well, I provide a heavy inactive, non-solid, conformable material between the exterior of casing 10—7—13 and the interior portion in which windings 5 and 14 are located. This yielding or conformable material can be of such a nature as to be chemically inactive, resistant to temperature that does not interfere with the rotation of shaft 3, and that does not mix with material 12. It can, for example, be semi-solid, like certain well known greases that do not readily liquefy at the temperature of operation. Under such circumstances, the grease being an insulator, it can be placed inside casing 10—7—13 to fill it substantially entirely, the moving parts merely cutting during the first few revolutions, a substantially frictionless path through this conformable material.

However, in the present form of the invention, I use a heavy liquid which of course can also be termed conformable, that separates the inside of the casing from the top part of the chamber 22, as for example, a pool of mercury 29 in chamber 22. In order to use this mercury as a seal, the shaft 3 carries an annular deflector 30 that extends from the top down into the mercury in chamber 22. This deflector 30 can be fastened to a shoulder 31 of shaft 3 by the aid of hub 32 and nut 33 engaging the shaft.

It is thus apparent that for any material 12 to enter into the lower part of casing 10—7—13, it must pass through the cover 21, downwardly into chamber 22 and upwardly around parts 24 and 29, and finally down through sleeve 24 into the casing. This is a tortuous vertical path, in which is interposed a large body of mercury.

In order to confine any possible splash of mercury 29 to chamber 22, I may provide a deflector flange 34 above the pool 29 in chamber 22; and to enhance this, the wall 23 of chamber 29 can be converged inwardly.

The casing 10—7—13 can thus be made fluid tight against the entry of any fluid or semifluid material around shaft 3. If the device is not subjected to any appreciable pressure, air can be retained in the casing; or otherwise, it can be filled with an insulating liquid such as oil which is substantially non-compressible. In that case, plugs 35, 36 can be used for filling the casing. First both plugs are removed; then oil is filled in; and then the plugs can be tightly screwed in place.

The electrical connections 37 for the motor can be led out of the casing through fluid tight members 38.

Since the specific gravity of the mercury 29 is much greater than that of the aqueous material 12, the mercury stays always at the bottom of the chamber 22.

In the following claims, I use the term "conformable" to designate either a liquid or a semiliquid, and as broad enough to cover mercury 29, or any semi-solid material that can be substituted therefor, such as grease.

I claim:

1. In a submersible electric motor, a motor casing subjected to fluid pressure greater than atmospheric pressure, a rotating member in said casing, said casing having a vertically arranged sleeve at its upper end, providing an opening to the casing, a shaft connected to the member and extending from the casing through the sleeve, and defining a clear annular space between the shaft and the sleeve, means forming a chamber around the sleeve, an annular member carried by the shaft and depending downwardly into the chamber, an insulation filling in the casing that can withstand considerable pressure and permit the rotating member to rotate, and a heavy inactive liquid in said chamber and extending above the bottom of the annular member.

2. In a submersible electric motor, a motor casing subjected to fluid pressure greater than atmospheric pressure, a rotating member in said casing, said casing having a re-entrant section at its upper end forming an annular deep pocket and a central aperture, a shaft connected to the member and extending substantially vertically through said aperture, means carried by the shaft, defining with said pocket, a tortuous passageway from the exterior to the interior of the casing, an insulation filling in the casing that can withstand considerable pressure and permit the rotating member to rotate, and sealing material in said passageway.

3. In a submersible electric motor, a motor casing subjected to fluid pressure greater than atmospheric pressure, a rotating member in said casing, said casing having a re-entrant section at its upper end forming an annular deep pocket and a central aperture, a shaft connected to the member and extending substantially vertically through said aperture, means carried by the shaft, defining with said pocket, a tortuous passageway from the exterior to the interior of the casing, an insulation filling in the casing that can withstand considerable pressure and permit the rotating member to rotate, and mercury in said passageway.

4. In a submersible electric motor, a motor casing subjected to fluid pressure greater than atmospheric pressure, a rotating member in said casing, said casing having a vertical opening at its upper end, a shaft connected to the member and extending through the opening out of the casing, said shaft defining a clear annular space between the shaft and the opening, means carried by the shaft and cooperating with the casing to form a tortuous passageway between said opening and an exterior medium in which the motor is adapted to be submerged, an insulation filling in the casing that can withstand considerable pressure and permit the rotating member to rotate, and sealing material in said passageway.

5. In a submersible electric motor, a vertical motor casing, a rotating member in said casing, said casing having a re-entrant section at its upper end, defining a pair of spaced walls forming between them an annular chamber, and the inner wall defining an aperture at the top of the casing, both said walls having their lower ends at a substantial distance below the top of the casing, a shaft connected to the rotating member and extending through said aperture and out of the casing, means carried by the shaft and extending into the chamber, for forming a tortuous passageway from the exterior to the interior of the casing, an insulation filling in the casing that can withstand considerable pressure and permit the rotating member to rotate, a sealing material in the passageway, and a bearing for the shaft supported at the bottom of the spaced walls.

6. In a power driven pump unit adapted to be submerged in a deep well, a motor casing, a rotating member in said casing for providing the power, said member having a shaft projecting out of the top of the casing, a filling in the casing of material lighter than the medium in which the unit is submerged, and means for preventing the lighter material from passing out into the said medium, comprising a sleeve forming a long passageway at the top of the casing and surrounding the shaft, and communicating at the bottom thereof with the interior of the casing, and an annular member surrounding the sleeve and spaced therefrom and extending over the top of the sleeve.

7. In a power driven pump unit adapted to be submerged in a deep well, a motor casing, a rotating member in said casing for providing the power, said member having a shaft projecting out of the top of the casing, a filling in the casing of material lighter than the medium in which the unit is submerged, and means for preventing the lighter material from passing out into the said medium, comprising means forming a long passageway from the top of the casing toward the bottom thereof, and surrounding the shaft, said means including an annular extension carried by the shaft and extending downwardly so as to form a tortuous passageway from the top of the casing into the medium.

8. In a power driven pump unit adapted to be submerged in a deep well, a motor casing, a rotating member in said casing for providing the power, said member having a shaft projecting out of the top of the casing, a filling in the casing of material lighter than the medium in which the unit is submerged, means for preventing the lighter material from passing out into the said medium, comprising a sleeve forming a long passageway at the top of the casing, and surrounding the shaft, and communicating at the bottom thereof with the interior of the casing, and an annular member surrounding the sleeve and spaced therefrom, and extending over the top of the sleeve, and means for replenishing the filler.

9. In a power driven pump unit adapted to be submerged in a deep well, a motor casing, a rotating member in said casing for providing the power, said member having a shaft projecting out of the top of the casing, a filling in the casing of material lighter than the medium in which the unit is submerged, and means for preventing the lighter material from passing out into the said medium, comprising means forming a long passageway from the top of the casing toward the bottom thereof, and surrounding the shaft, said means including an annular extension carried by the shaft and extending downwardly so as to form a tortuous passageway from the top of the casing into the medium, and a heavy liquid at the bottom of the passageway.

10. In a submersible electric motor, a motor casing subjected to fluid pressure greater than atmospheric pressure, a rotating member in said casing, said casing having a long vertically arranged sleeve at its upper end, providing an opening to the casing, a shaft connected to the member and extending from the casing through the sleeve, an annular member carried by the shaft and depending downwardly, said sleeve and member being one inside the other, and an insulation filling in the casing lighter than the medium in which the motor is submerged.

THOMAS G. MYERS.